United States Patent
Missik-Gaffney et al.

(10) Patent No.: US 8,056,592 B2
(45) Date of Patent: Nov. 15, 2011

(54) GRIP TIRE WITH ADDED PUNCTURE PROTECTION

(75) Inventors: Lisa Marie Missik-Gaffney, North Jackson, OH (US); Brian David Digman, Cuyahoga Falls, OH (US); John Fleming Brainerd, II, Medina, OH (US); Timothy Michael Rooney, Munroe Falls, OH (US); Jonathan James Shondel, Massillon, OH (US)

(73) Assignee: The Goodyear Tire + Rubber Company, Inc., Akron, OH (US)

( * ) Notice: Subject to any disclaimer, the term of this patent is extended or adjusted under 35 U.S.C. 154(b) by 1049 days.

(21) Appl. No.: 11/931,009

(22) Filed: Oct. 31, 2007

(65) Prior Publication Data
US 2009/0107600 A1 Apr. 30, 2009

(51) Int. Cl.
B60C 11/01 (2006.01)
B60C 11/11 (2006.01)
(52) U.S. Cl. ........... 152/209.8; 152/209.16; 152/209.19; 152/523; 152/902
(58) Field of Classification Search ............... 152/209.8, 152/209.9, 209.16, 523, 209.19, 902; D12/605
See application file for complete search history.

(56) References Cited

U.S. PATENT DOCUMENTS

| | | | |
|---|---|---|---|
| 3,645,314 A | 2/1972 | Verdier | |
| 4,055,209 A * | 10/1977 | Senger | 152/209.18 |
| 4,312,395 A | 1/1982 | Baus | |
| 4,462,445 A | 7/1984 | Goergen | |
| 4,823,855 A * | 4/1989 | Goergen et al. | 152/209.18 |
| 4,982,773 A | 1/1991 | Bonko | |
| 5,085,259 A | 2/1992 | Goergen et al. | |
| 5,109,903 A | 5/1992 | Watanabe et al. | |
| 5,198,047 A | 3/1993 | Graas et al. | |
| 5,358,021 A | 10/1994 | Takasugi et al. | |
| 5,647,926 A | 7/1997 | van der Meer et al. | |
| 5,658,404 A | 8/1997 | Brown et al. | |
| 5,833,779 A | 11/1998 | van der Meer et al. | |
| 6,189,586 B1 | 2/2001 | Guidry | |
| 6,298,890 B1 | 10/2001 | Binsfeld | |
| 6,520,230 B1 | 2/2003 | Ratliff, Jr. | |
| 6,530,405 B1 | 3/2003 | Brown et al. | |
| 6,601,623 B1 * | 8/2003 | Katayama | 152/DIG. 3 |
| D504,388 S * | 4/2005 | Umstot et al. | D12/605 |
| D517,980 S * | 3/2006 | Umstot et al. | D12/600 |
| 7,134,467 B2 | 11/2006 | Neubauer et al. | |
| 7,152,641 B2 | 12/2006 | Ooyama | |
| 7,178,570 B2 | 2/2007 | Murata | |
| D563,312 S * | 3/2008 | Brainerd et al. | D12/605 |
| 2006/0137790 A1 | 6/2006 | de Barsy | |
| 2008/0047642 A1 * | 2/2008 | Ohara et al. | 152/209.15 |

FOREIGN PATENT DOCUMENTS

FR 2237771 * 3/1975

OTHER PUBLICATIONS

Machine translation for France 2,237,771 (no date).*

* cited by examiner

Primary Examiner — Steven D Maki
(74) Attorney, Agent, or Firm — Roger D. Emerson; Timothy D. Bennett; Emerson Thomson Bennett

(57) ABSTRACT

A lightweight truck and passenger vehicle tire having an improved tread design that provides numerous biting edges for increased grip in mud, snow, loose debris, and when climbing rocks as well as providing increased protection from punctures and cuts to the tire's shoulder and upper sidewall regions.

19 Claims, 15 Drawing Sheets

GRIP TIRE WITH ADDED PUNCTURE PROTECTION

I. BACKGROUND OF THE INVENTION

A. Field of Invention

This invention pertains to the art of methods and apparatuses regarding the manufacture of pneumatic tires, and more particularly to methods and apparatuses regarding the manufacture of light truck and passenger vehicle tires having a tread with improved off-the-road (OTR) traction and increased protection from punctures.

B. Description of the Related Art

It is known to provide light truck and sport utility vehicle (SUV) tires with a more rugged look and to increase the tire's off-road performance characteristics. Light truck and passenger vehicle tires with a more rugged look, when mounted on a light truck or sport utility vehicle, enable the operator to drive in limited off-the-road (OTR) conditions and to engage in recreational OTR activities. Often, the vehicle operator will reduce inflation pressures in the tire. This reduced inflation pressure softens the ride and causes the tire's footprint to increase to improve OTR traction. Generally, tires have a tread that is well-suited for a specific vehicle application. Tires designed specifically for OTR activities commonly have treads made up of widely spaced lugs that provide a high number of biting surfaces. These biting surfaces enable the tire to both grip uneven terrain and to throw out any mud accumulating between them.

Typically, tread design is a matter of trade-offs. An increase in a tread's off-road performance typically results in a decrease in the tread's on-road performance. For example, the widely spaced lugs or other very aggressive tread patterns commonly used for OTR performance provide high void areas, or areas not in contact with the ground. This causes the tread to be relatively noisy, exhibit poor vibrational characteristics, and have generally poor tread wear when used on paved roads. One known solution is to provide the tread with a center on-road portion, for providing quality on-road performance, and a pair of OTR shoulder portions that extend into the tire's shoulder and upper sidewall regions, for providing improved OTR performance. Commonly, these OTR shoulder portions will have widely spaced tread patterns similar to those designed specifically for OTR performance. During OTR activities, such as trail-riding and rock climbing, where increased traction is required, the tire's shoulder regions contact the uneven ground or loose terrain. By providing the OTR shoulder portions, additional biting edges are available for increased traction and performance. Because the OTR shoulder portions generally do not contact the flat, even paved surfaces, the tire's OTR performance can be increased while limiting a corresponding decrease in the tire's on-road performance.

Although known light truck tires work well for their intended purpose, several disadvantages exist. Decreased inflation pressures and widely spaced lugs in the OTR shoulder portions cause a significant increase in the chance that the tire's unprotected areas such as the shoulder and upper sidewall regions will be punctured or cut during recreational OTR activities. Conventionally, tire manufacturers have attempted to decrease this risk by increasing the under-tread gauge, increasing the net-to-gross ratio of the tread, adding plies and belts to the carcass, or using new rubber compounds. One disadvantage to these known methods is that they cause an increase in both the weight and cost of the tire. An increased tire weight causes a decrease in the tire's OTR performance and an increased tire cost causes a decrease in the general marketability of the tire. What is needed then is a light truck and passenger vehicle tire that decreases the risk of punctures and cuts to the shoulder and upper sidewall regions of the tire that does not cause a significant increase in the weight of the tire therefore leading to a decrease in the tire's OTR performance.

II. SUMMARY OF THE INVENTION

According to one embodiment of this invention, a light truck or passenger vehicle tire may have a carcass structure, a belt structure, a tread, a first sidewall, and a second sidewall. The tread may have a first and a second lateral tread edge, a tread surface having a plurality of traction elements extending radially outward from the tread base, a plurality of lateral grooves, and a plurality of circumferential grooves that divide the plurality of traction elements into a plurality of rows of traction elements. The plurality of rows of traction elements may have a first shoulder row adjacent to the first lateral tread edge, a second shoulder row adjacent to the second lateral tread edge, and at least one central row disposed between the first shoulder row and the second shoulder row.

The first shoulder row may have a first block element, a second block element, a first raised pad element, and a second raised pad element. The first block element may have a first main portion, a first connecting portion, a first second-surface portion, and a first shoulder extension that extends to a point axially outward from the first lateral tread edge. The first main portion may extend axially from one of the circumferential grooves to a point axially inward from the first lateral tread edge. The second block element may have a second main portion, a second connecting portion, a second second-surface portion, and a second shoulder extension. The second main portion may extend axially from one of the circumferential grooves to the first lateral tread edge. The first and second raised pads element may be positioned within one of the lateral grooves. The first block element and the second block element may be circumferentially adjacent to each other and may be separated by one of the lateral grooves, the first raised pad element, and the second raised pad element.

The second shoulder row may have a third block element, a fourth block element, a third raised pad element and a fourth raised pad element. The third block element may have a third main portion, the first connecting portion, the first second-surface portion, and a third shoulder extension that extends to a point axially outward from the second lateral tread edge. The third main portion may extend axially from one of the circumferential grooves to a point axially inward from the second lateral tread edge. The fourth block element may have a fourth main portion, the second connecting portion, the second second-surface portion, and a fourth shoulder extension. The fourth main portion may extend axially from one of the circumferential grooves to the second lateral tread edge. The third and fourth raised pads element may be positioned within one of the lateral grooves. The third block element and the fourth block element may be circumferentially adjacent to each other and may be separated by one of the lateral grooves, the third raised pad element, and the fourth raised pad element.

The first sidewall structure may have a maximum section width location that divides the first sidewall structure into a first lower sidewall region and a first upper sidewall region. The first upper sidewall region may extend from the maximum section width location to the first lateral tread edge. The first upper sidewall region may comprise a first u-shaped sidewall block element. The second sidewall structure may have a maximum section width location that divides the second sidewall structure into a second lower sidewall region and a second upper sidewall region. The second upper sidewall region may extend from the maximum section width location to the second lateral tread edge. The second upper sidewall region may comprise a peaked-shaped sidewall block element. The second main portion may be substantially the same shape and size as the fourth main portion. The first main portion may be substantially the same shape and size as the third main portion. The first peaked shoulder extension is substantially the same shape and size as the second peaked shoulder extension. The first raised pad element may have a greater axial length than the second raised pad element, and the third raised pad element may have a greater axial length than the fourth raised pad element. The first raised pad element may be substantially the same shape and size as the third raised pad element and the second raised pad element may be substantially the same shape and size as the fourth raised pad element.

According to another embodiment of this invention, a light truck or passenger vehicle tire may have a carcass structure, a belt structure, a tread, a first sidewall, and a second sidewall. The tread may have a first and second lateral tread edges, a tread surface having a plurality of traction elements extending radially outward from the tread base, a plurality of lateral grooves and a plurality of circumferential grooves that divide the plurality of traction elements into a plurality of rows of traction elements. The plurality of rows of traction elements may have a first shoulder row adjacent to the first lateral tread edge, a second shoulder row adjacent to the second lateral tread edge, and at least one central row disposed between the first shoulder row and the second shoulder row.

The first shoulder row may have a first block element, a second block element, a first raised pad element, and a second raised pad element. The first block element may have a first main portion, a first connecting portion, a first second-surface portion, and a first shoulder extension that extends to a point axially outward from the first lateral edge. The first main portion may extend axially from one of the circumferential grooves to a point axially inward from the first lateral tread edge. The second block element may have a second main portion, a second connecting portion, a second second-surface portion, and a second shoulder extension. The second main portion may extend axially from one of the circumferential grooves to the first lateral tread edge. The first and second raised pads element may be positioned within one of the lateral grooves. The first block element and the second block element may be circumferentially adjacent to each other and may be separated by one of the lateral grooves, the first raised pad element, and the second raised pad element.

The second shoulder row may have a third block element, a fourth block element, a third raised pad element, and a fourth raised pad element. The third block element may have a third main portion, the first connecting portion, the first second-surface portion, and a third shoulder extension that extends to a point axially outward from the second lateral tread edge. The third main portion may extend axially from one of the circumferential grooves to a point axially inward from the second lateral tread edge. The fourth block element may have a fourth main portion, the second connecting portion, the second second-surface portion, and a fourth shoulder extension. The fourth main portion may extend axially from one of the circumferential grooves to the second lateral tread edge. The third and fourth raised pads element may be positioned within one of the lateral grooves. The third block element and the fourth block element may be circumferentially adjacent to each other and may be separated by one of the lateral grooves, the third raised pad element, and the fourth raised pad element.

The first sidewall structure may have a maximum section width location that divides the first sidewall structure into a first lower sidewall region and a first upper sidewall region. The first upper sidewall region extends from the maximum section width location to the first lateral tread edge. The first upper sidewall region comprises a first u-shaped sidewall block element. The second sidewall structure may have a maximum section width location that divides the second sidewall structure into a second lower sidewall region and a second upper sidewall region. The second upper sidewall region extends from the maximum section width location to the second lateral tread edge. The second upper sidewall region comprises a peaked-shaped sidewall block element. In one embodiment of the invention, the first shoulder row may have a net-to-gross ratio that is substantially the same as the net to gross ratio of the second shoulder row.

The first main portion and the third main portion may each have a single sipe. The first main portion and the third main portion may each have a semi blind groove. The blind groove may be adjacent to one of the circumferential grooves. The second and third main portions may each comprise a plurality of sipes. In one embodiment, the second and third main portions each comprise four sipes. The peaked shoulder extensions may extend to a point that is radially inward from the radially outermost point of the peaked-shaped sidewall block and radially outward from the radially innermost point of the peak-shaped sidewall block. The u-shaped sidewall blocks may be at least partially separated by one of the first shoulder extensions.

According to another embodiment of this invention, a light truck or passenger tire may have a carcass structure, a belt structure, a tread, and a first sidewall structure. The tread may have a first and a second lateral tread edge, a tread surface, a plurality of lateral grooves, and a plurality of circumferential grooves. The tread surface may have a plurality of traction elements extending radially outwardly from the tread base. The plurality of circumferential grooves may divide the plurality of traction elements into a plurality of rows of traction elements. The plurality of rows of traction elements may have a first shoulder row adjacent to the first lateral tread edge and at least one central row disposed between the first shoulder row and the second lateral tread edge. The first shoulder row may have a first block element, a second block element, a first raised pad element, and a second raised pad element. The first block element and the second block element may be circumferentially adjacent to each other and may be separated by one of the lateral grooves, the first raised pad element, and the second raised pad element. The first and second raised pad elements may be positioned within one of the lateral grooves.

The first block element may comprise a first main portion, a first connecting portion, a first second-surface portion, and a first shoulder extension that extends to a point axially outward from the first lateral tread edge. The first main portion may axially extend from one of the circumferential grooves to a point axially inward from the first lateral tread edge. The second block element may comprise a second main portion, a second connecting portion, a second second-surface portion, and a second shoulder extension. The second main portion may extend from one of the circumferential grooves to the first lateral tread edge. The first sidewall structure may comprise a maximum section width location. The maximum section width location may divide the first sidewall structure into a first lower sidewall region and a first upper sidewall region. The first shoulder region may be defined by the maximum section width location and the first lateral tread edge. The first upper sidewall region may comprise a u-shaped block element. The u-shaped sidewall block element may be at least partially adjacent to the first shoulder extension.

According to one embodiment of this invention, a light truck or passenger tire may have a carcass structure, a belt structure, a tread, and a first sidewall structure. The tread may have a first and a second lateral edge, a tread surface, a plurality of lateral grooves, and a plurality of circumferential grooves. The tread surface may have a plurality of traction elements extending radially outwardly from the tread base. The plurality of circumferential grooves may divide the plurality of traction elements into a plurality of rows of traction elements. The plurality of rows of traction elements may have a second shoulder row adjacent to the second lateral tread edge and at least one central row disposed between the second shoulder row and the first lateral tread edge. The second shoulder row may have a third block element, a fourth block element, a third raised pad element, and a fourth raised pad element. The third block element and the fourth block element may be circumferentially adjacent to each other and may be separated by one of the lateral grooves, the third raised pad element, and the fourth raised pad element. The third and fourth raised pad elements may be positioned within one of the lateral grooves.

The third block element may have a third main portion, a first connecting portion, a first second-surface portion, and a first peaked shoulder extension that extends to a point axially outward from the second lateral tread edge. The third main portion may extend from one of the circumferential grooves to a point axially inward from the second lateral tread edge. The fourth block element may have a fourth main portion, a second connecting portion, a second second-surface portion, and a second peaked shoulder extension. The fourth main portion may axially extend from one of the circumferential grooves to the second lateral tread edge. The second sidewall structure may have a maximum section width location that divides the second sidewall structure into a second lower sidewall region and a second upper sidewall region. The second upper sidewall region may be defined by the maximum section width location and the second lateral tread edge. The second upper sidewall region may comprise a peak-shaped sidewall block element. The first and second peaked shoulder extensions may extend to a point that is radially inward from the radially outermost point of the peak-shaped sidewall block element and radially outward from the radially innermost point of the peak-shaped sidewall block element.

One advantage of this invention is that the tread provides the tire with increased protection from punctures and cuts to the tire's shoulder and upper sidewall regions without a significant increase in the tire's weight. By eliminating or greatly reducing the increase in weight associated with known methods for increasing tire protection from punctures and cuts, the resulting increase in the tire's OTR performance is not reduced or off-set by the increased tire weight.

Another advantage of this invention is that the tread provides for increased traction over known tread designs. The placement of thin raised pads, or "mud ejectors," between each shoulder block, increases the tire's ability to break up and release mud from between the grooves located in the tire's shoulder regions. The multi-leveled sidewall block elements provide added biting edges in mud, snow, loose debris, and when climbing rocks while also providing protection from elements that may cause cuts or punctures to the tire.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DEFINITIONS

Figure 1:
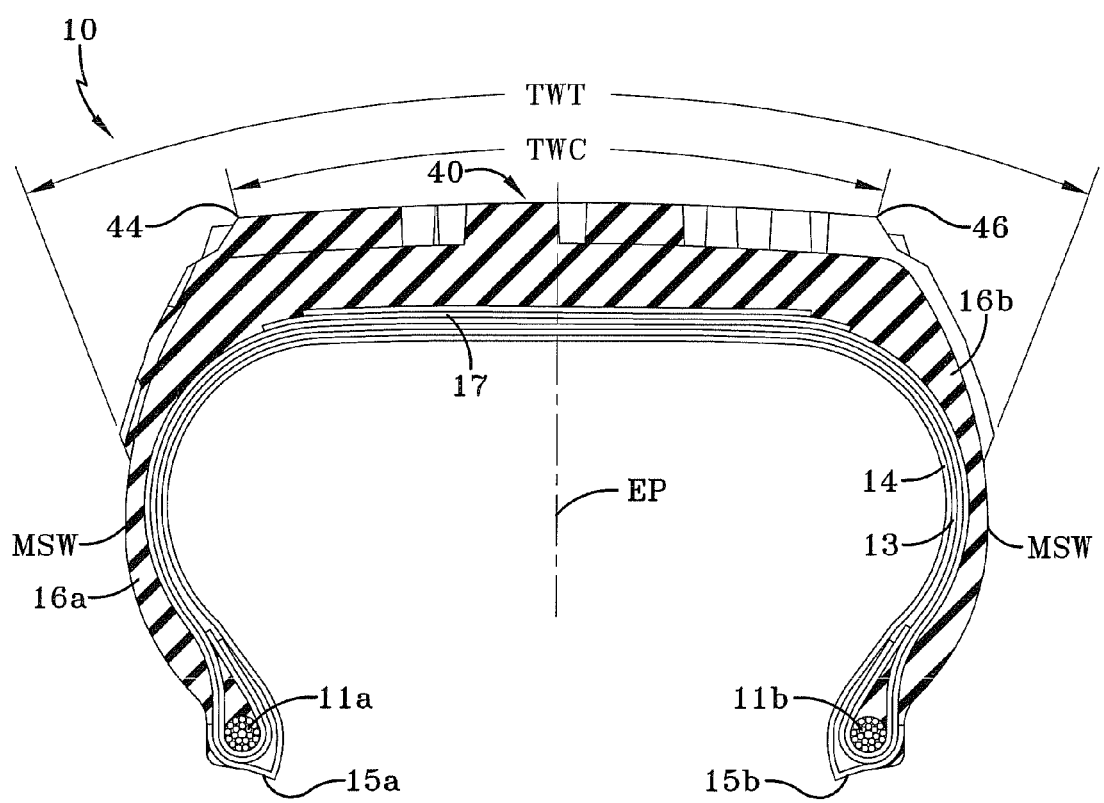
FIG. 1 is a cross-sectional view of a vehicle tire taken across the axis of rotation according to one embodiment of the invention.

The following terms may be used throughout the descriptions presented herein and should generally be given the following meaning unless contradicted or elaborated upon by other descriptions set forth herein.

"Annular" means formed like a ring.

"Aspect Ratio" means the ratio of a tire's section height to its section width.

"Asymmetric Tread" means a tread that has a tread pattern not symmetrical about the center-plane or equatorial plane (EP) of the tire.

"Axial" and "axially" means lines or directions that are parallel to the axis of rotation of the tire.

"Block Element" means a tread element defined by a circumferential groove or a shoulder and a pair of lateral extending grooves.

"Circumferential" means circular lines or directions extending along the surface of the sidewall perpendicular to the axial direction.

"Compensated Tread Width" means the tread width multiplied by the aspect ratio.

"Equatorial Plane" means the plane perpendicular to the tire's axis of rotation and passing through the center of its tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to the tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tire bars" tending to maintain a rib-like character in the tread region involved.

"Inboard Side" means the side of the tire nearest the vehicle when the tire is mounted on a wheel and the wheel is mounted on the vehicle.

"Lateral" means an axial direction.

"Net Contact Area" means the total area of ground contacting elements between defined boundary edges divided by the gross area between the boundary edges as measured around the entire circumference of the tread.

"Net to Gross Ratio" means the total area of ground contacting tread elements between the lateral edges around the entire circumference of the tread divided by the gross area of the entire tread between the lateral edges.

"Non-directional Tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard Side" means the side of the tire farthest away from the vehicle when the tire is mounted on a wheel and the wheel is mounted on the vehicle.

"Radial" and "radially" mean directions radially toward or away from the axis of rotation of the tire.

"Rib" means a circumferentially extending strip of rubber of the tread which is defined by at least one circumferential groove and either a second groove or a lateral edge, the strip being laterally undivided by full-depth grooves.

"Shoulder" means the upper portion of sidewall just below the tread edge.

"Sipe" means small slots molded into the tread elements of the tire that subdivide the tread surface and improve traction.

"Tenacity" means the stress expressed as force per unit linear density of an unstrained specimen (gm/tex or gm/denier), (usually used in textiles).

"Tread" means a molded rubber component which, when bonded to a tire casing, includes that portion of the tire that comes into contact with the road when the tire is normally inflated and under normal load.

"Tread Arc Radius" means a radius of curvature extending in a lateral direction and having its center on the equatorial plane which is followed by the radially outer surfaces of the tread portion. The tread arc radius may be symmetrical or asymmetrical with respect to the equatorial plane of the tire.

"Tread Element" or "Traction Element" means a rib or block element.

"Tread Width" means the axial distance between the lateral edges of the tire.

"Zig-zag" means a line, path, or groove comprising straight segments arranged end-to-end and oriented at angles of other than 0° with respect to one another.

V. DETAILED DESCRIPTION OF THE INVENTION

Referring now to the drawings wherein the showings are for purposes of illustrating embodiments of the invention only and not for purposes of limiting the same, FIG. 1 shows an on/off road light truck or passenger tire 10 having a tread 40 according to one embodiment of the invention. The on/off road light truck or passenger tire 10 may comprise a carcass portion 12 that may extend between and may be turned Up around a pair of opposing beads 11*a*, 11*b*. The carcass portion 12 may comprise at least one reinforcing ply 13 and may be positioned radially outward of an innerliner 14 that extends between opposing bead toes 15*a*, 15*b*. The number of reinforcing plies 13 may be any number determined to provide adequate load bearing capacity in the tire 10 in accordance with engineering standards which are well known in the art. A pair of sidewall structures 16*a*, 16*b* may extend between the carcass portion 12 and the tread 40. A belt structure 17 may be positioned radially outward of the carcass portion 12 and radially inward of the tread 40. The belt structure 17 may comprise multiple plies of reinforcing cords. The tread 40 when configured annularly has an axis of rotation that is perpendicular to a first and a second lateral tread edge 44, 46.

Figure 2:
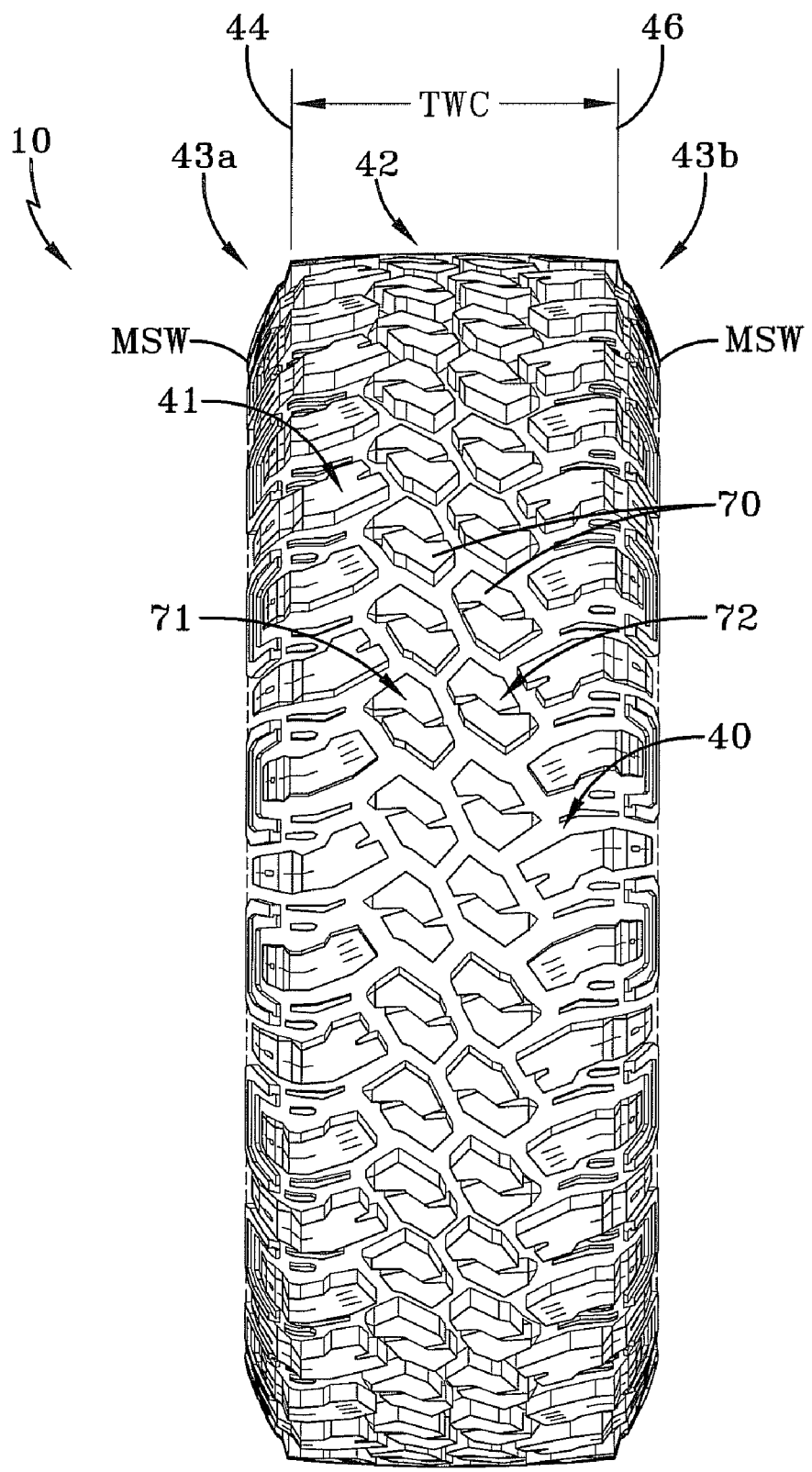
FIG. 2 is a front view of a vehicle tire embodying a tread made in accordance with one embodiment of the invention.

With reference now to FIGS. 1-2, the tread 40 may comprise a tread surface 41, a central portion 42, a first shoulder region 43*a*, and a second shoulder region 43*b*. The central portion 42 may be defined between the first and second lateral tread edges 44, 46 and may have a tread width TWC. The first shoulder region 43*a* may extend from the first lateral tread edge 44 to a maximum section width location MSW of the sidewall structure 16*a*. The second shoulder region 43*b* may extend from the second lateral tread edge 46 to a maximum section width location MSW of the sidewall structure 16*b*.

Figure 3:
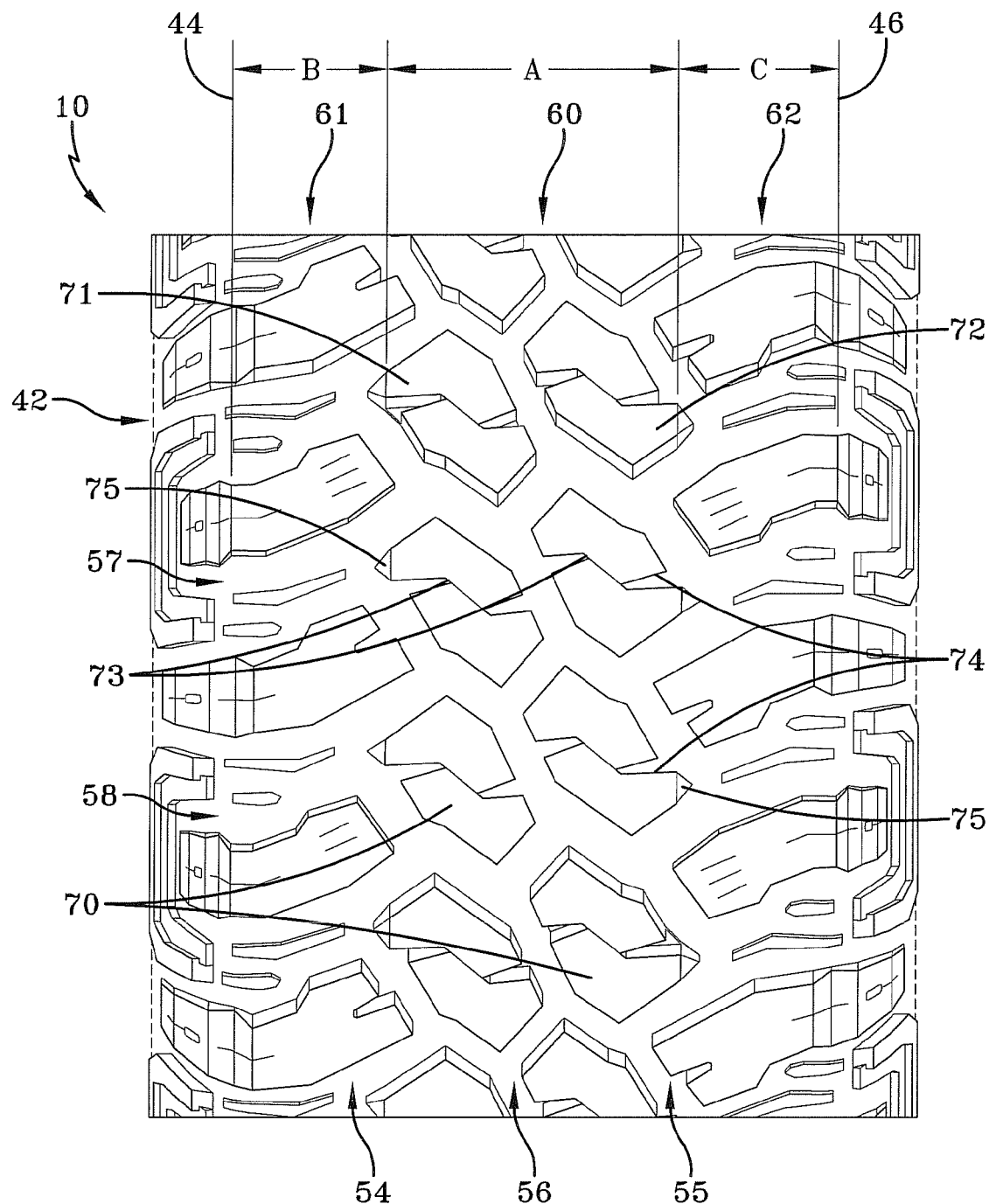
FIG. 3 is an enlarged fragmentary front view showing the central portion of the vehicle tire shown in FIG. 2 according to one embodiment of the invention.

With reference now to FIGS. 2-3, according to one embodiment of the invention, the central portion 42 may comprise a plurality of ground engaging traction elements separated by circumferential grooves 54, 55, 56 and lateral grooves 57, 58. The circumferential grooves 54, 55, 56 may define a central zone 60, a first shoulder zone 61, and a second shoulder zone 62. The central zone 60 may extend from the circumferential groove 54 to the circumferential groove 55. The first shoulder zone 61 may extend from the first lateral tread edge 44 to the first circumferential groove 54. The second shoulder zone 62 may extend from the second lateral tread edge 46 to the second circumferential groove 55. The first and second shoulder zones 61, 62 may comprise a net contact area less than the central tread zone 60. The central tread zone 60 may comprise a high net contact area that may be greater than either the value of the first shoulder zone 61 or the value of the second shoulder zone 62.

With reference now to FIGS. 2-3, the central zone 60 may comprise an average tread road contacting axial width A; the first shoulder zone 61 may comprise an average tread road contacting axial width B; and, the second shoulder zone 62 may comprise an average tread road contacting axial width C. The axial width A may be greater than the axial width B or the axial width C. The axial width B may be equal to the axial width C. The circumferential groove 54 may comprise an average axial width D and the circumferential groove 55 may comprise an average axial width E. The axial width E may be equal to the axial width D. It is known that the central zone 60, when used on the lightly loaded rear wheel position of a light truck on paved surfaces, bears most of the load. The central zone 60 may comprise the greatest axial width. The circumferential groove 54 adjacent the first shoulder zone 61 may be about equal in width to the circumferential groove 55 adjacent the second shoulder zone 62.

With reference now to FIG. 3, according to one embodiment of the invention, the central zone 60 may comprise a plurality of traction blocks 70. The plurality of traction blocks 70 may be arranged in two circumferentially extending rows 71, 72 and, in one embodiment of the invention, the circumferentially adjacent traction blocks 70 may be separated by the lateral grooves 57, 58. The first row 71 may extend axially from the circumferential groove 56 to the circumferential groove 55. The second row 72 may extend axially from the circumferential groove 56 to the circumferential groove 55. The traction blocks 70 may be circumferentially separated by the lateral grooves 57, 58. The traction blocks 70 may be divided by an inclined semi-blind groove 73. A semi-blind groove may be defined as a small, narrow slot that is molded into a tread element of a tire and that extends from a lateral or a circumferential groove and terminates within the body of the tread element. The semi-blind groove 73 may be laterally elongated and may create a plurality of central block biting edges 74. The traction blocks 70 may comprise a corner 75. The corner 75 may comprise an acute included angle that may be chamfered or beveled. The second row 72 may also comprise the traction blocks 70. The traction blocks 70 may comprise the same appearance and overall shape of the first row 71 but may be oppositely oriented with respect to the equatorial plane of the tire.

Figure 4:
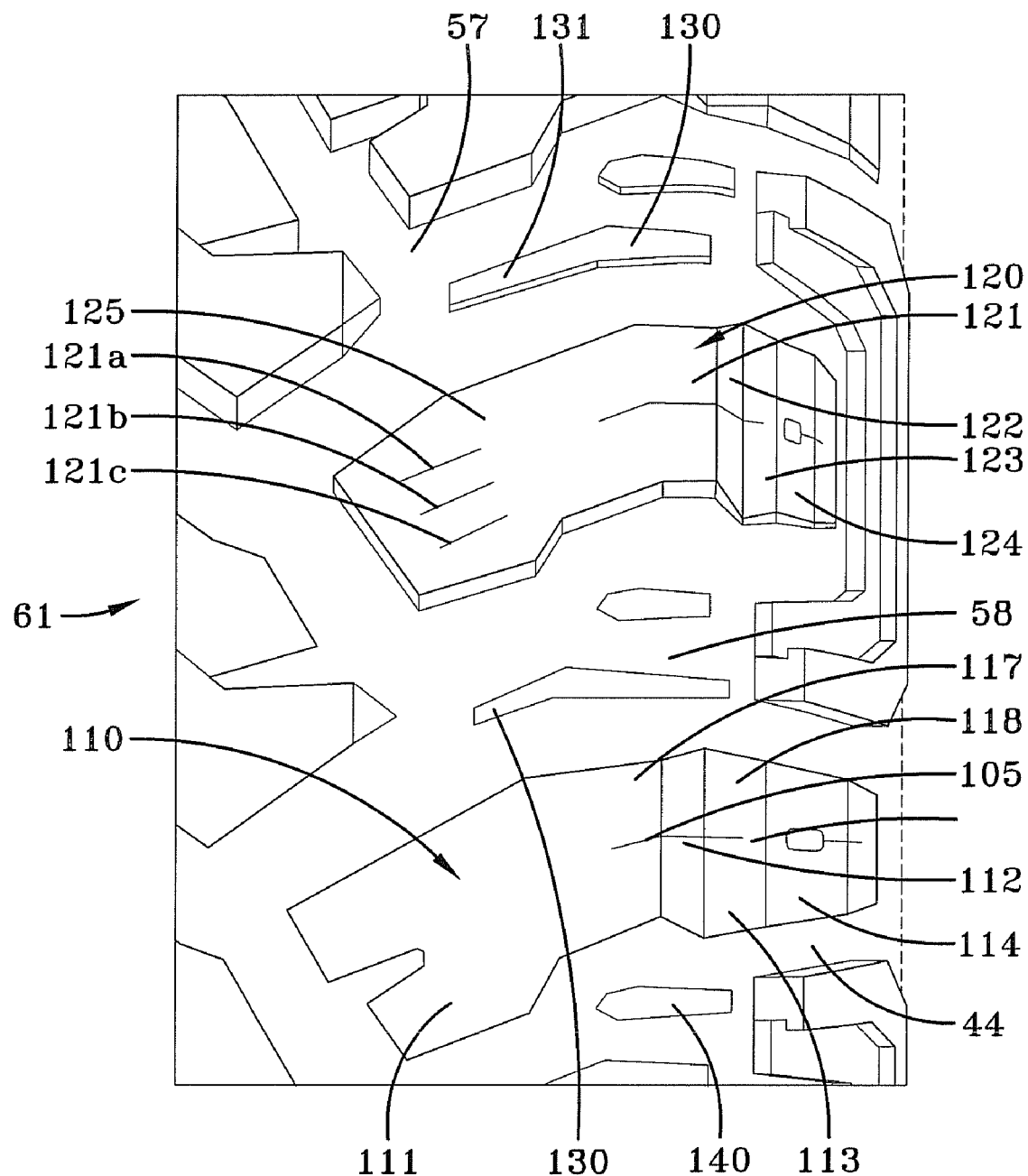
FIG. 4 is an enlarged fragmentary view showing a shoulder zone of the tire of FIG. 2 according to one embodiment of the invention.
Figure 5:
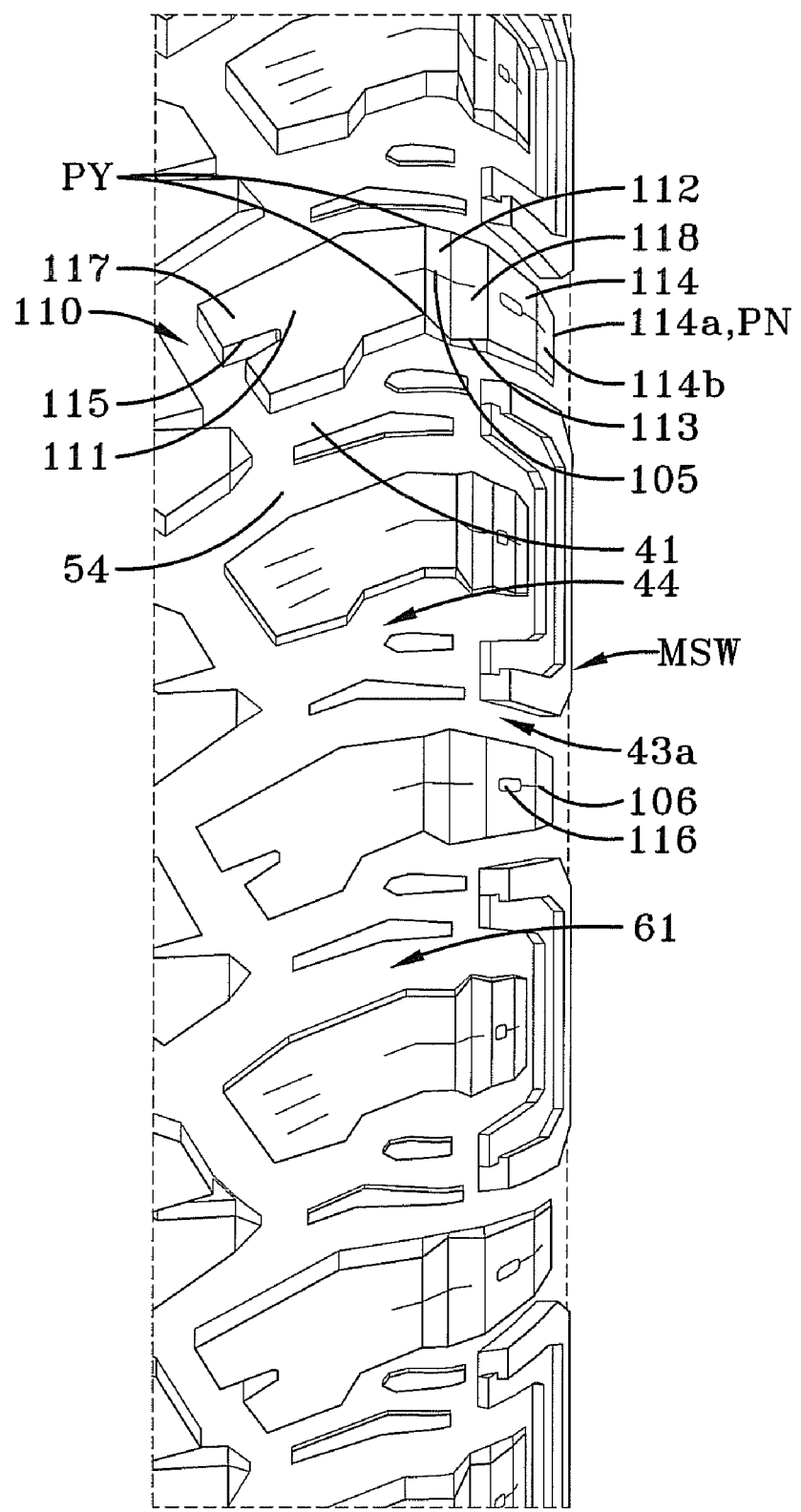
FIG. 5 is an enlarged fragmentary schematic view showing a shoulder zone and a shoulder region of the tire of FIG. 2 according to one embodiment of the invention.
Figure 6:
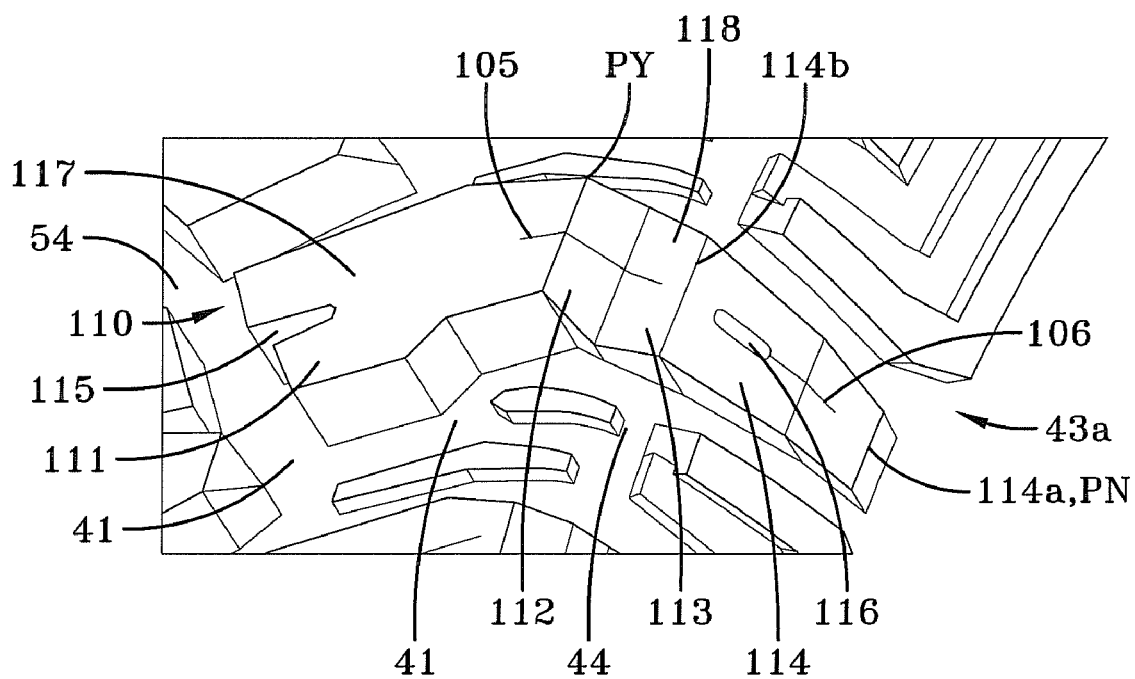
FIG. 6 is an enlarged perspective view of a shoulder block element according to one embodiment of the invention.
Figure 8:
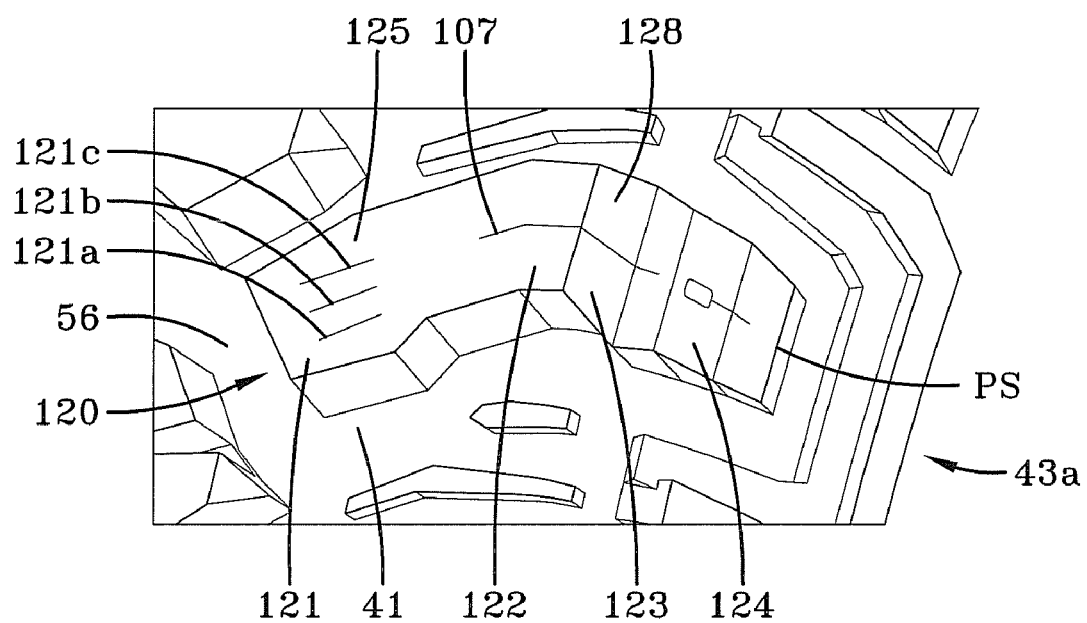
FIG. 8 is an enlarged perspective view of a shoulder block element according to one embodiment of the invention.
Figure 7:
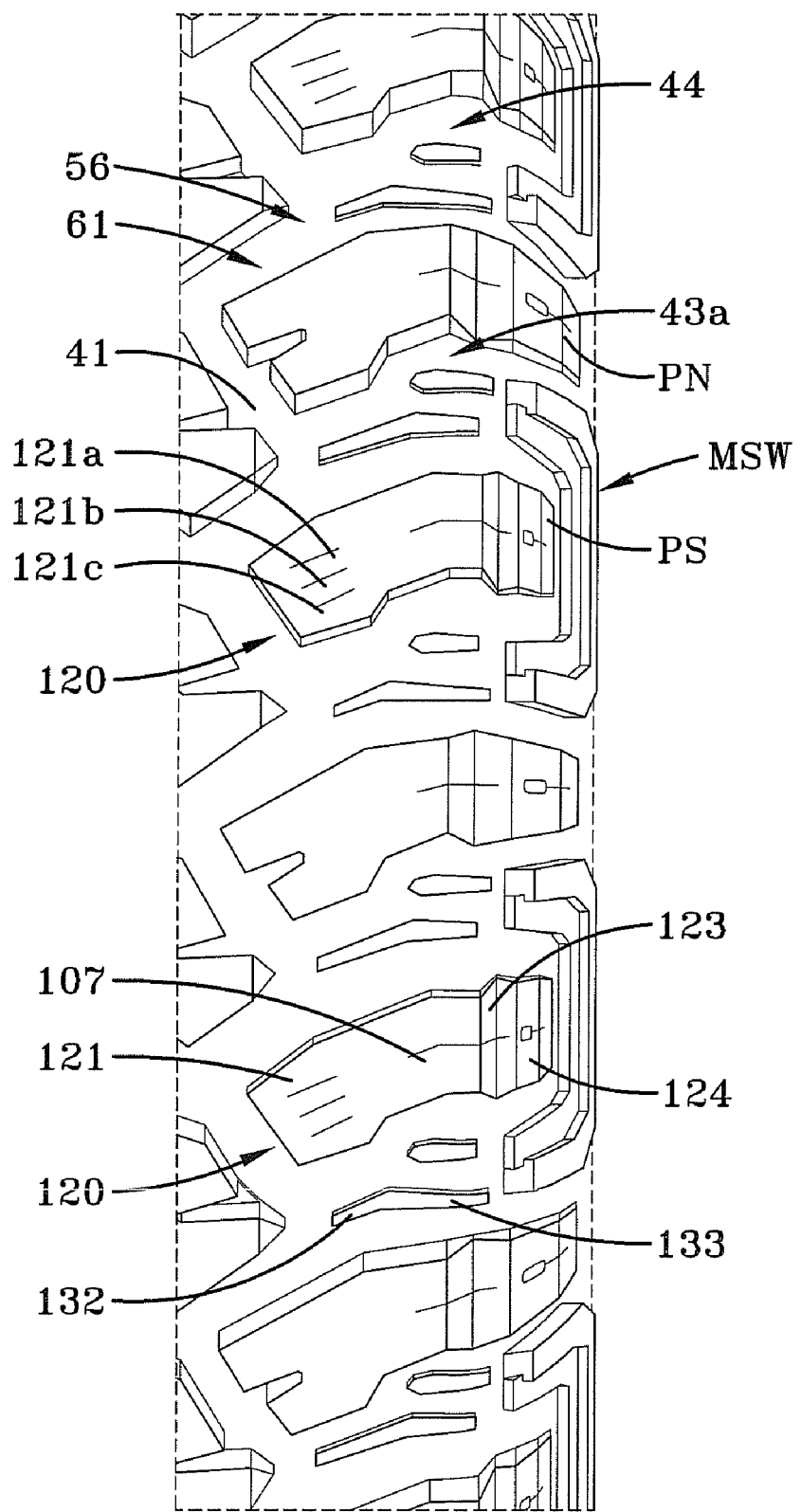
FIG. 7 is an enlarged fragmentary schematic view showing a shoulder zone and a shoulder region of the tire of FIG. 2 according to one embodiment of the invention.
Figure 9:
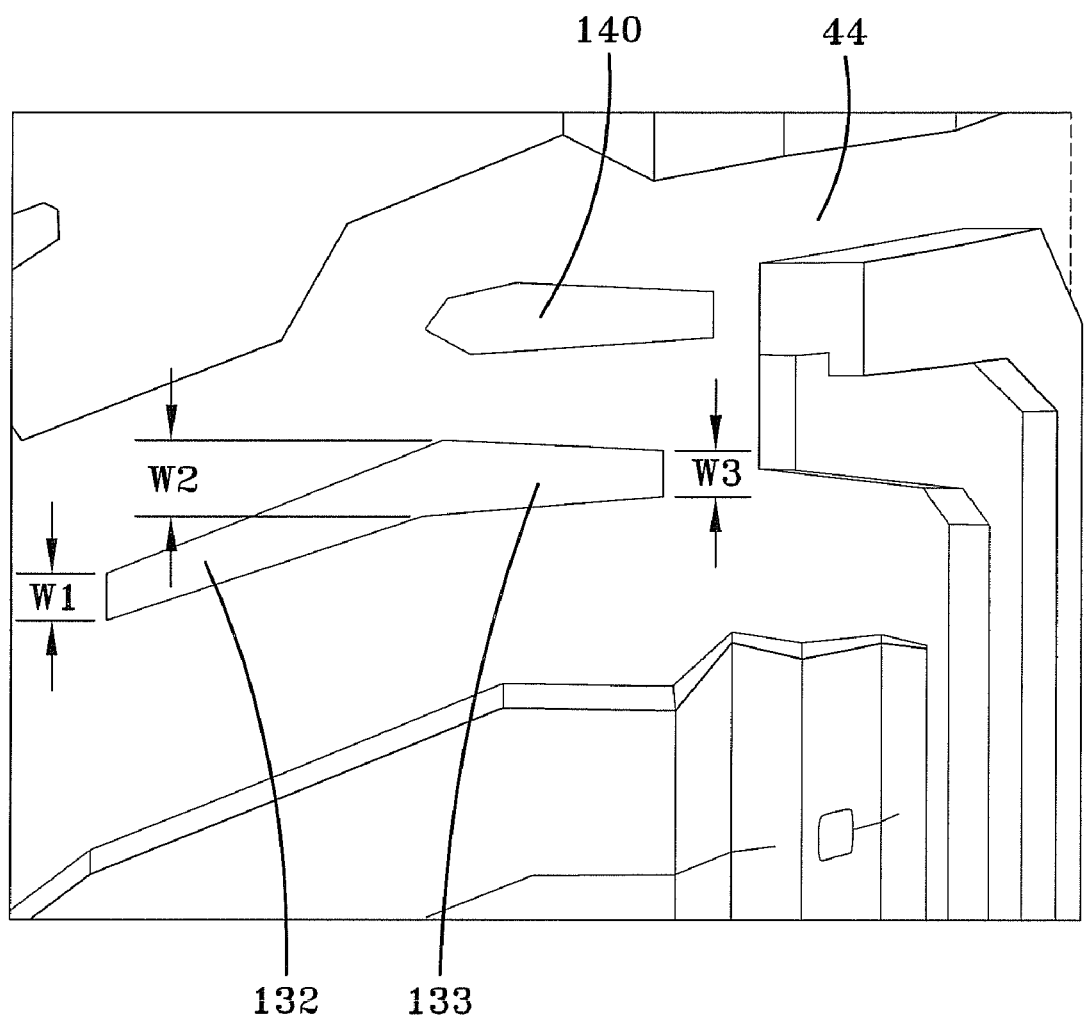
FIG. 9 is an enlarged fragmentary schematic view showing an elongated and shorter raised pad element of the tire of FIG. 2.
Figure 10:
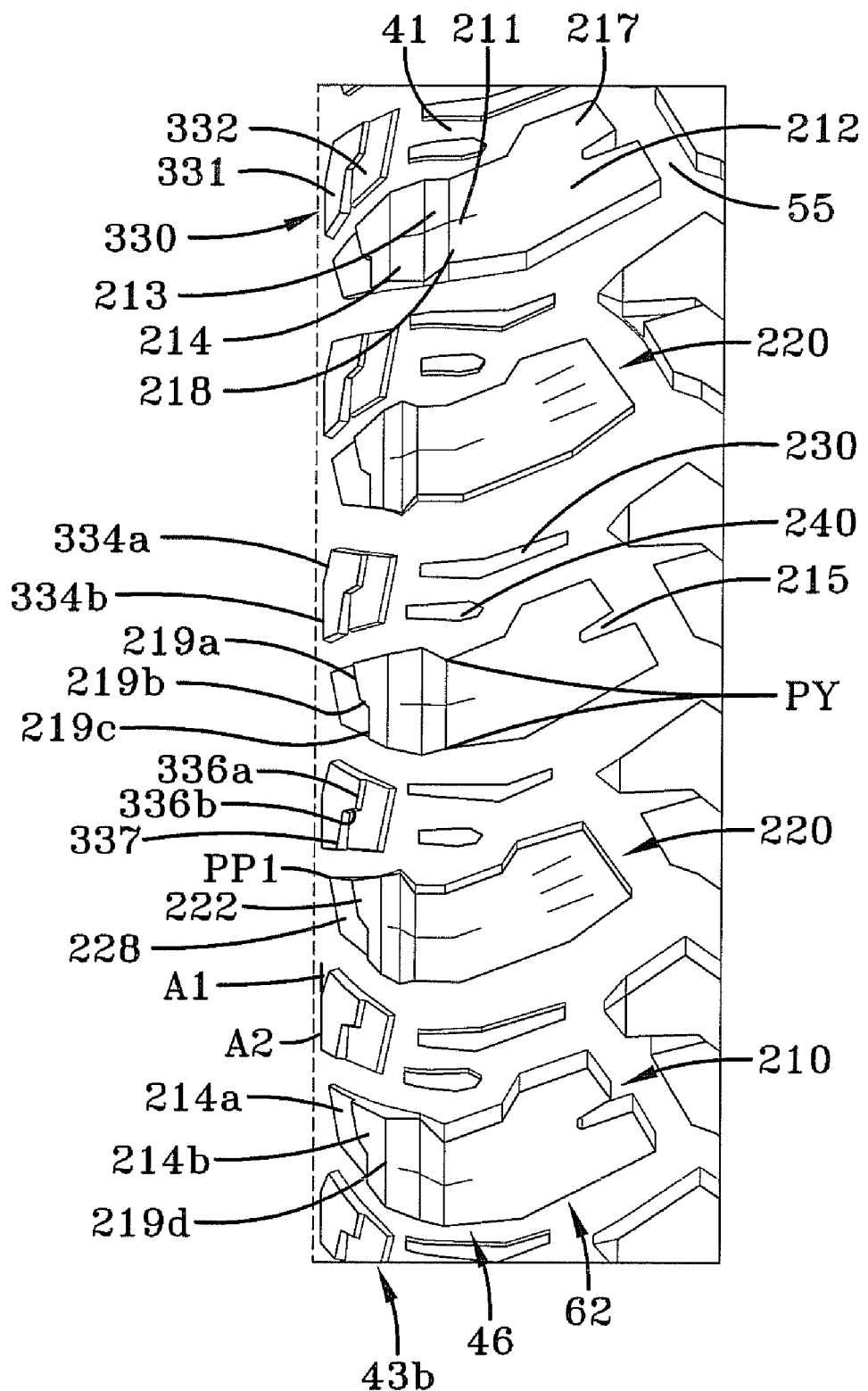
FIG. 10 is an enlarged fragmentary view showing a shoulder zone of the tire of FIG. 2 according to one embodiment of the invention.
Figure 11:
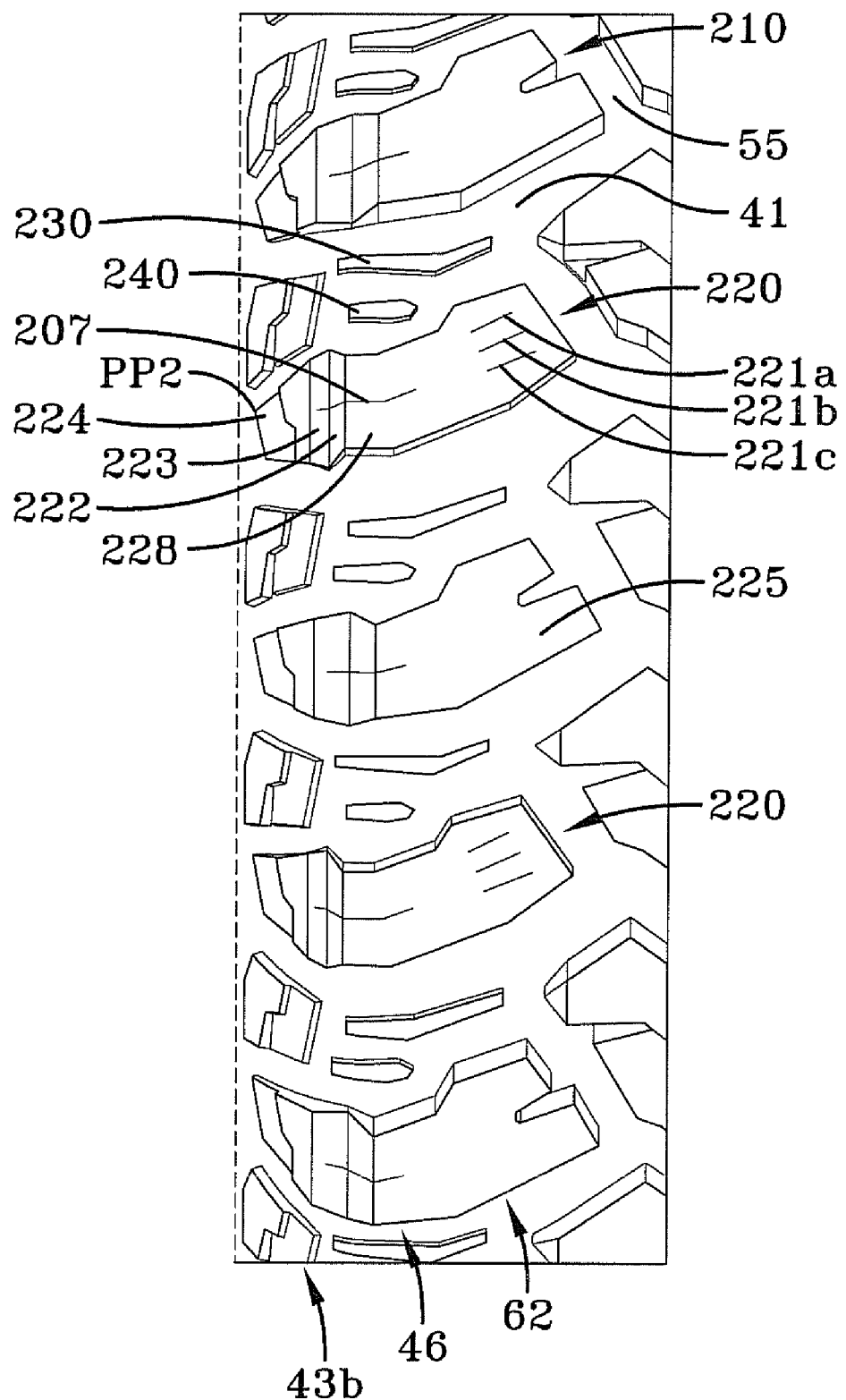
FIG. 11 is an enlarged fragmentary view showing a shoulder zone of the tire of FIG. 2 according to one embodiment of the invention.
Figure 12:
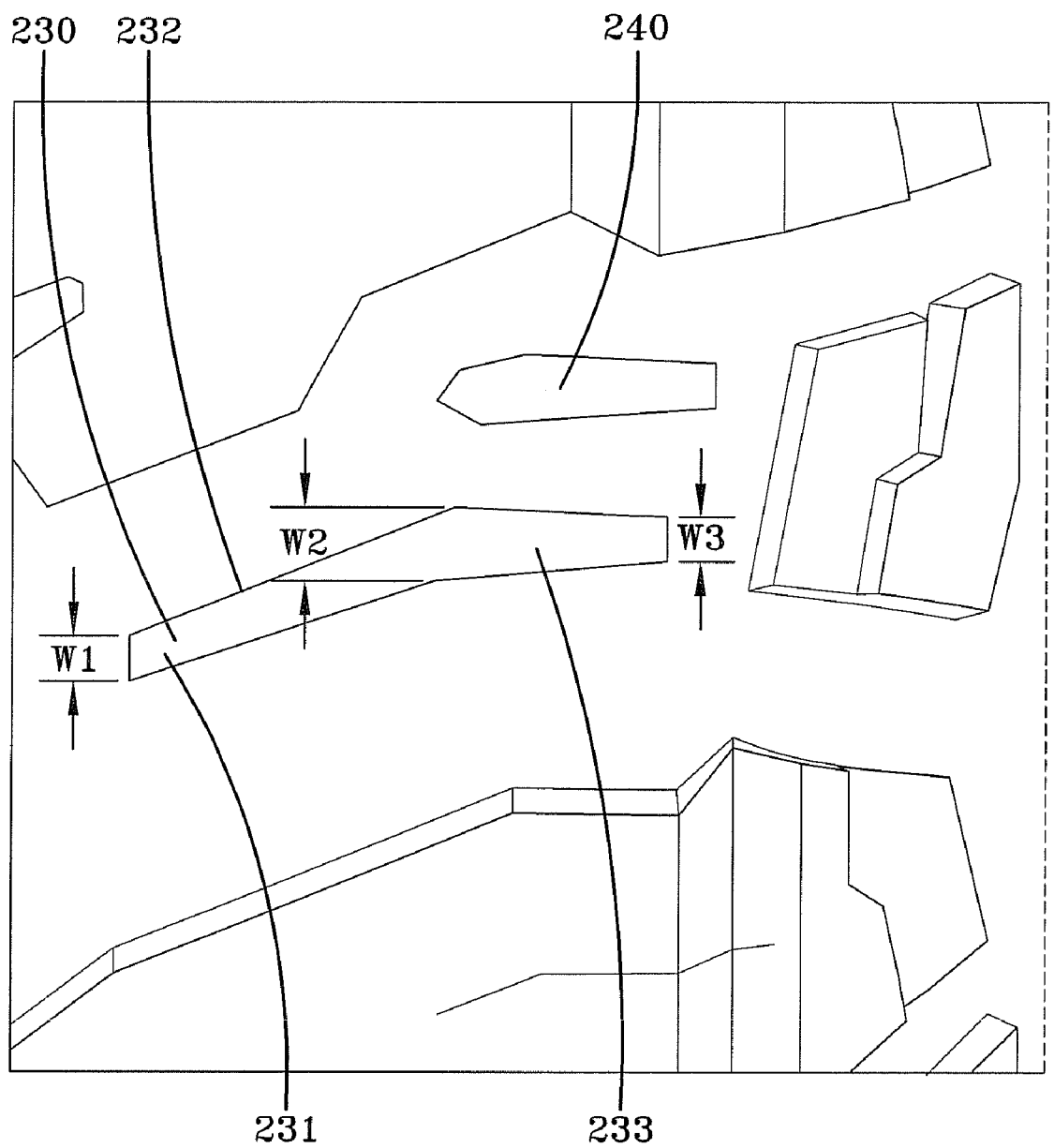
FIG. 12 is an enlarged fragmentary schematic view showing an elongated and shorter raised pad element of the tire of FIG. 2.
Figure 13:
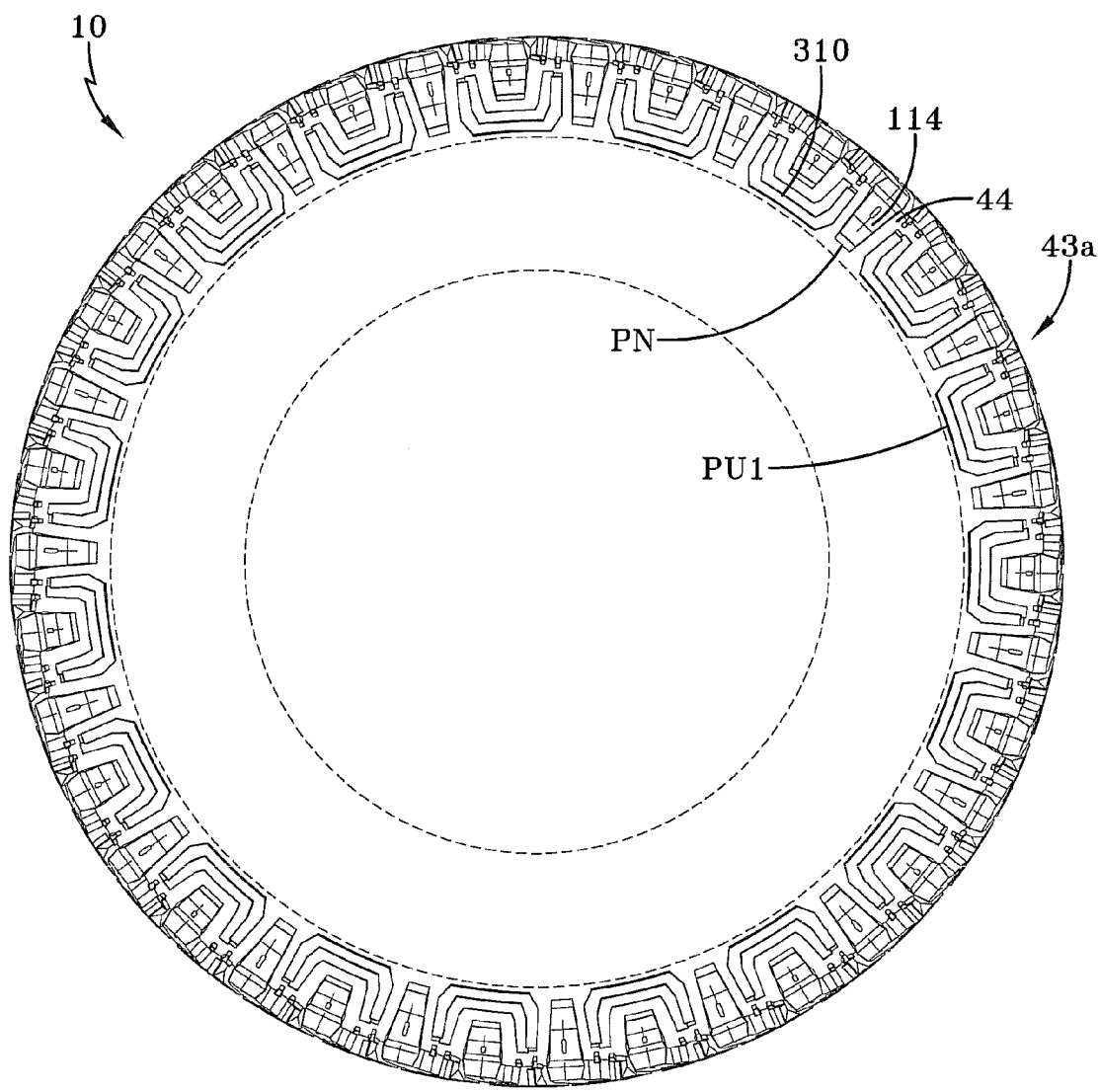
FIG. 13 is a side view showing the U-shaped sidewall blocks of the tire of FIG. 2 according to one embodiment of the invention.
Figure 14:
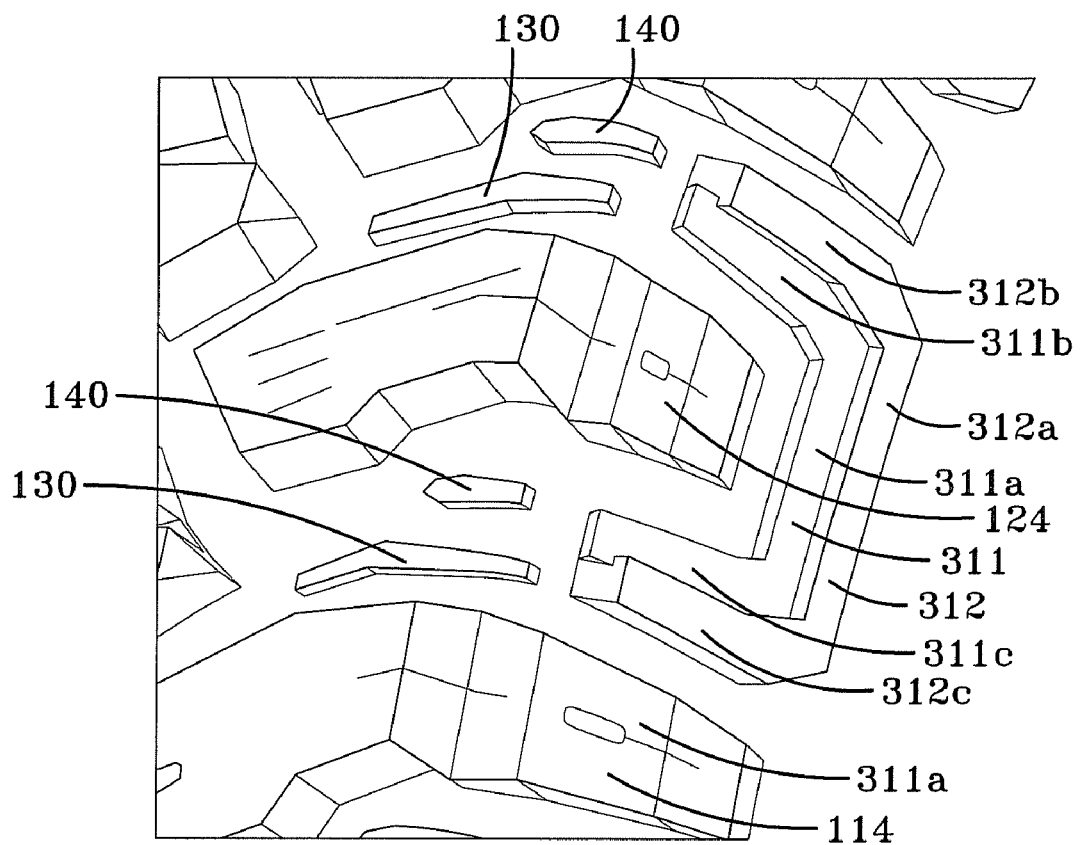
FIG. 14 is an enlarged fragmentary perspective view of a shoulder zone and a shoulder region comprising u-shaped sidewall blocks according to one embodiment of the invention.
Figure 15:
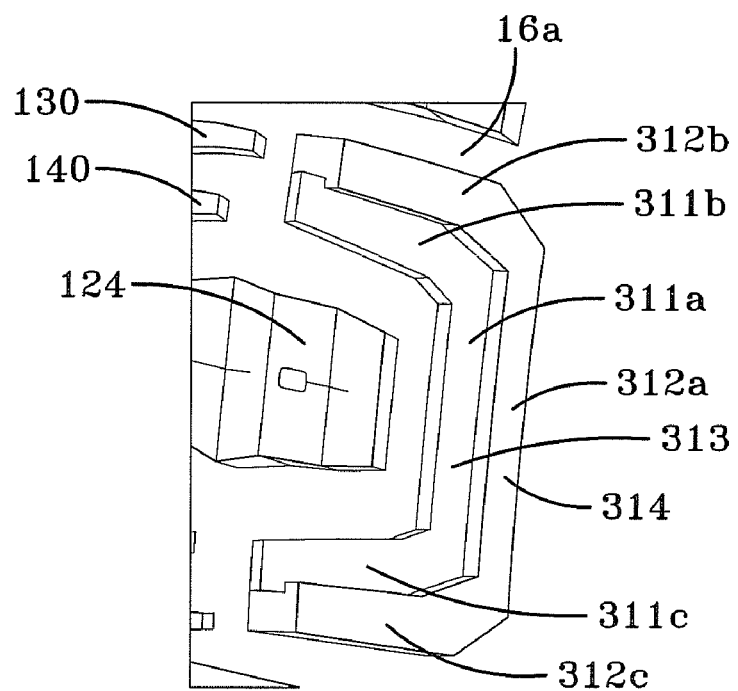
FIG. 15 is an enlarged fragmentary perspective view of a u-shaped sidewall block according to one embodiment of the invention.
Figure 16:
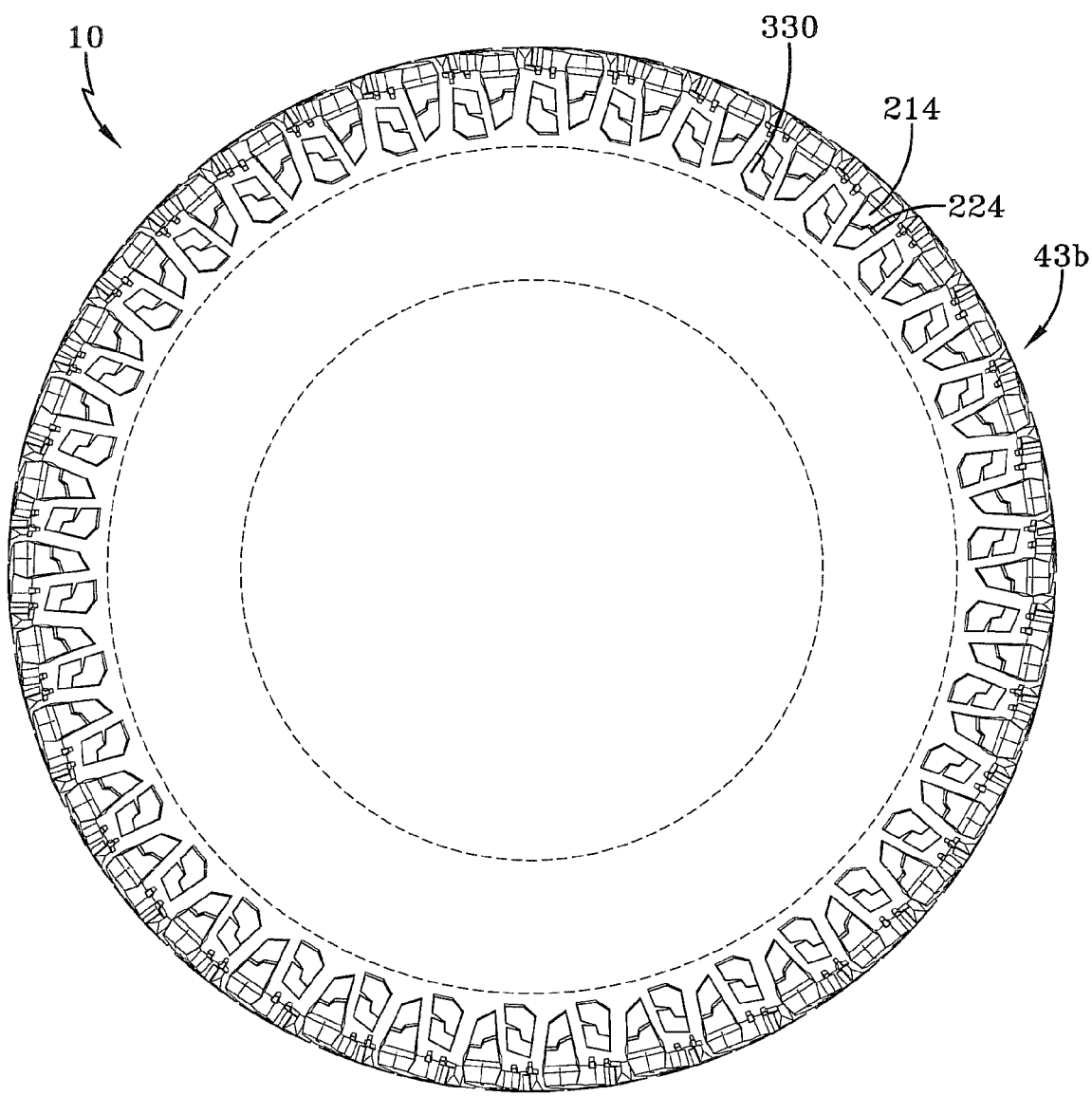
FIG. 16 is a side view showing the peak-shaped sidewall blocks of the tire of FIG. 2 according to one embodiment of the invention.
Figure 17:
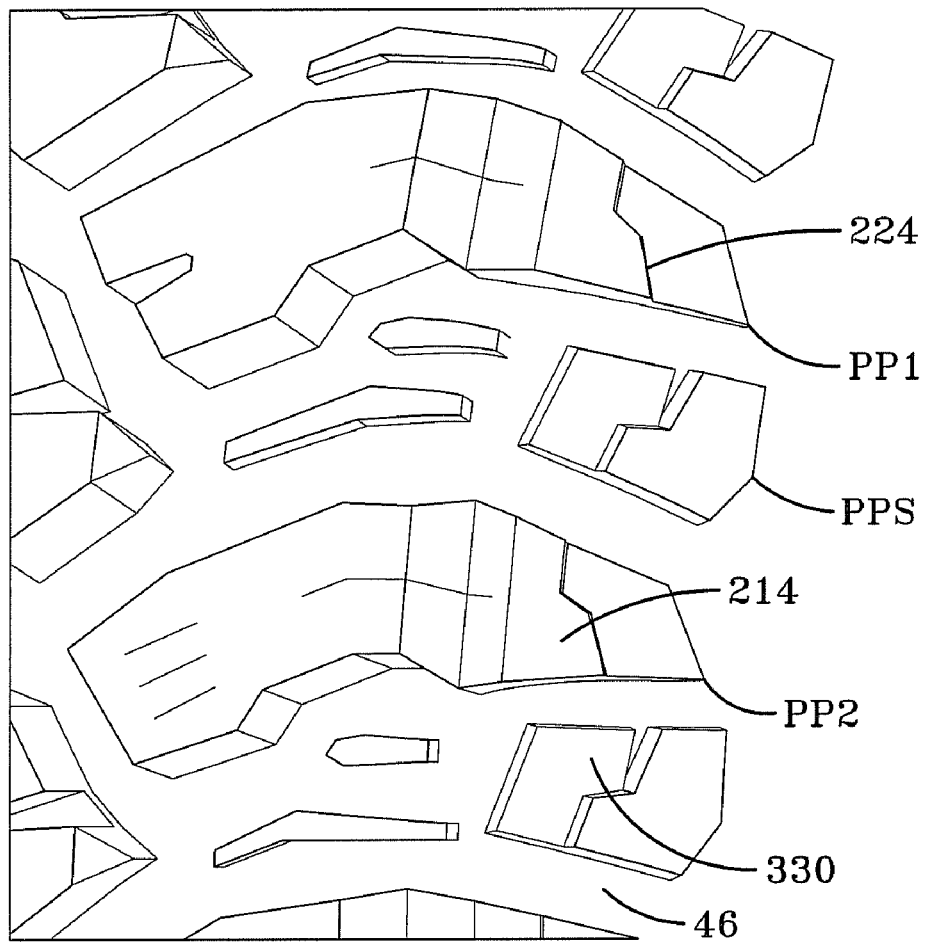
FIG. 17 is an enlarged fragmentary perspective view of a shoulder zone and a shoulder region comprising peak-shaped sidewall blocks according to one embodiment of the invention.
Figure 18:
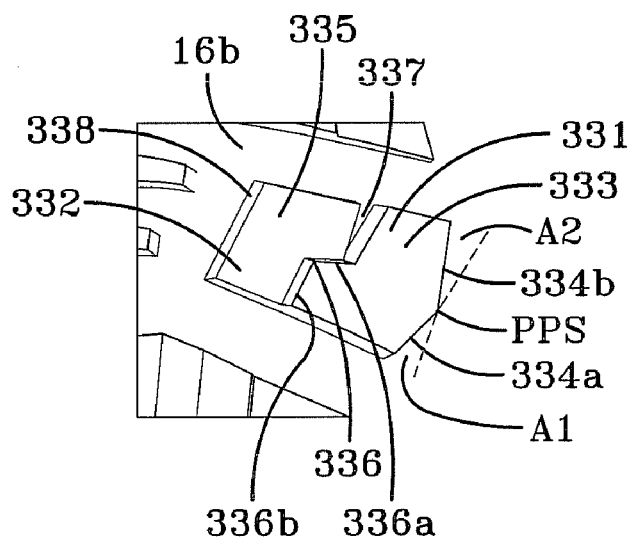
FIG. 18 is an enlarged fragmentary perspective view of a peak-shaped sidewall block according to one embodiment of the invention.

With reference now to FIGS. 2-4, the first shoulder zone 61 may comprise a first shoulder block 110, a second shoulder block 120, an elongated raised pad 130, and a shorter raised pad 140. In one embodiment of the invention, the first shoulder block 110 may be circumferentially adjacent to the second shoulder block 120. The first shoulder block 110 and the second shoulder block 120 may be separated by the lateral grooves 57, 58 as well as the elongated raised pad 130 and the shorter raised pad 140. The elongated raised pad 130 may be adjacent to the shorter raised pad 140. Both the elongated raised pad 130 and the shorter raised pad 140 may be positioned within the lateral grooves 57, 58.

With reference now to FIGS. 2-6, The first shoulder block 110 may comprise a first main portion 111, a connecting portion 112, a second-surface portion 113, and a first shoulder extension 114. The first shoulder block 110 may also comprise a first sipe 105. The first sipe 105 may be narrower and less deep than the circumferential grooves 54, 55, 56. The first sipe 105 may substantially bisect the first shoulder block 110 axially from a point axially outward from the circumferential groove 54 to a point axially inward of the first lateral tread edge 44 that may be located in the second-surface portion 113. The first main portion 111 may be a one-blade, axially elongated portion that extends radially outward from the tread surface 41 to a first radial surface 117. The first main portion 111 may substantially comprise the shape of the letter Y and may provide a plurality of biting edges. The first main portion 111 may extend from the circumferential groove 54 to a first point PY that may be axially inward from the first lateral tread edge 44. The first main portion 111 may comprise a semi-blind groove 115. The semi-blind groove 115 may be located along the axially innermost edge of the first main portion 111 directly adjacent to the circumferential groove 54.

With continued reference to FIGS. 2-6, the connecting portion 112 may be a radially-inward sloped surface connecting the first main portion 111 to the second-surface portion 113. The sloped surface of the connecting portion 112 may provide additional biting surfaces to the first shoulder block 110. The sipe 105 may extend axially across the connecting portion 112 and may substantially bisect the connecting portion 112. The second-surface portion 113 may extend across the first lateral tread edge 44, to a point axially outward from the axially outer most end of the first sipe 105, and connect the connecting portion 112 to the first shoulder extension 114. The second-surface portion may extend radially outward from the tread surface 41 to a second radial surface 118. The second radial surface 118 may be radially inward than the first radial surface 117. The first shoulder extension 114 may extend the first shoulder block 110 into the first shoulder region 43a. The first shoulder extension 114 may extend to a point PN radially outward of the maximum section width location MSW. The first shoulder extension 114 may comprise a radially innermost edge 114a that is shorter than a radially outermost edge 114b. The first shoulder extension 114 may comprise a blind groove 116 and a second sipe 106. The blind groove 116 may comprise a radial length RL and may be more narrow than the circumferential grooves 54, 55, 56 but wider than the second sipe 106. The blind groove 116 may have a depth that is substantially equal to that of the circumferential grooves 54, 55, 56. The second sipe 106 may connect to the radially innermost end of the blind groove 116 forming a continuous line that starts and terminates within the body of the first shoulder extension 114.

With reference now to FIGS. 2-8, the second shoulder block 120 may comprise a second main portion 121, a connecting portion 122, a second-surface portion 123, and a second shoulder extension 124. The second shoulder block 120 may further comprise a third sipe 107 that is substantially similar in size and location to the first sipe 105 of the first shoulder block 110. The second main portion 121 may comprise a four-blade, axially elongated portion that may extend radially from the tread surface 41 to a first radial surface 125. The second main portion 121 may comprise a plurality of inner sipes. In one embodiment of the invention, the plurality of sipes may comprise a first, a second, and a third sipe 121a, 121b, and 121c. The plurality of inner sipes 121a, 121b, and 121c may be less deep and more narrow than the circumferential grooves 54, 55, 56. The plurality of sipes 121a, 121b, and 121c may be substantially parallel to each other and may be substantially equidistance apart. The connecting portion 122 and the second-surface portion 123 may connect the second main portion 121 to the second shoulder extension 124 and may be substantially similar in size and shape to the connection portion 112 and the second-surface portion 113 respectively. The second-surface portion 121 may extend radially from the tread surface 41 to a second radial surface 128. The second radial surface 128 may be radially inward from the first radial surface 125. The second shoulder extension 124 may extend the second shoulder block 120 into the first shoulder region 43a to a point PS. The point PS may be located radially outward from the point PN of the first shoulder extension 114. The second shoulder extension 124 may comprise a shape that is shorter and truncated when compared to the first shoulder extension 114 of the first shoulder block 110.

With reference now to FIGS. 2-9, the elongated pad 130 may be axially elongated and extend radially from the tread surface 41 to a radial pad surface 131. The radial pad surface 131 may be radially inward from radial surfaces 125, 128 of the second shoulder block 120 and the radial surfaces 117, 118 of the first shoulder block 110. The elongated pad 130 may comprise an axially inner portion 132 and an axially outer portion 133. The elongated pad 130 may have an axially innermost width W1, a width W2 at the point where the axially inner portion 132 abuts the axially outer portion 133, and a axially outmost width W3. The axially innermost width W1 and the axially outermost width W3 may be less than the width W2. According to one embodiment of the invention, the axially innermost width W1 is approximately equal to the axial outmost width W3. The shorter raised pad 140 extends from a point approximately circumferentially aligned with the point where the axially inner portion 132 and the axially outer portion 133 of the elongated raised pad 130 abut to a point axially inward from the axially outermost point of the elongated raised pad 130.

With reference now to FIGS. 2-4, the second shoulder zone 62 may comprise a third shoulder block 210, a fourth shoulder block 220, an elongated raised pad 230, and a shorter raised pad 240. The third shoulder block 210 may be circumferentially adjacent to the fourth shoulder block 220. The third shoulder block 210 and the fourth shoulder block 220 may be separated by the lateral grooves 57, 58 as well as the elongated raised pad 230 and the shorter raised pad 240. The elongated raised pad 230 may be adjacent to the shorter raised pad 240. Both the elongated raised pad 230 and the shorter raised pad 240 may be positioned within the lateral grooves 57, 58. The third shoulder block 210 and the fourth shoulder block 220 may be positioned such that the third shoulder blocks 210 of the second shoulder zone 62 are axially aligned with the second shoulder blocks 120 of the first shoulder zone 61. Accordingly, the fourth shoulder blocks 220 of the second shoulder zone 62 may be axially aligned with the first shoulder blocks 110 of the first shoulder zone 61.

With reference now to FIGS. 2-4, 10, the third shoulder block 210 may comprise a third main portion 211, a connecting portion 212, a second-surface portion 213, and a peaked shoulder extension 214 as described in greater detail below. The third shoulder block 210 may also comprise a first sipe 205. The first sipe 205 may be more narrow and less deep than the circumferential grooves 54, 55, 56. The first sipe 205 may substantially bisect the third shoulder block 210 axially from a point axially outward from the circumferential groove 55 to a point axially outward of the second lateral tread edge 46 that may be located in the second-surface portion 213. The third main portion 211 may be a one-blade, axially elongated portion that extends radially outward from the tread surface 41 to a first radial surface 217. The third main portion 211 may substantially comprise the shape of the letter Y and may provide a plurality of biting edges. In one embodiment of the invention, the third main portion 211 may be similar in size and shape to the first main portion 111. The third main portion 211 may extend from the circumferential groove 55 to a first point PY that may be axially inward from the second lateral tread edge 46. The third main portion 211 may comprise a semi-blind groove 215. The semi-blind groove 215 may be located along the axially innermost edge of the third main portion 211 directly adjacent to the circumferential groove 55.

With continued reference to FIGS. 2-4, 10, the connecting portion 212 may be a radially-inward sloped surface connecting the third main portion 211 to the second-surface portion 213. The sloped surface of the connecting portion 212 may provide additional biting surfaces to the third shoulder block 210. The sipe 205 may extend axially across the connecting portion 212 and may substantially bisect the connecting portion 212. The second-surface portion 213 may extend across the second lateral tread edge 46, to a point axially outward from the axially outer most end of the first sipe 205, and connect the connecting portion 212 to the peaked shoulder extension 214. The second-surface portion may extend radially outward from the tread surface 41 to a second radial surface 218. The second radial surface 218 may be radially inward than the first radial surface 217. The peaked shoulder extension 214 may extend the third shoulder block 210 into the second shoulder region 43b. The peaked shoulder extension 214 may extend to a point PP1 radially outward of the maximum section width location MSW. The peaked shoulder extension 214 may comprise a first peak portion 214a and a second peak portion 214b. The first peak portion 241a and the second peak portion 241b may each comprise a peaked shape that has numerous biting edges in order to provide added grip in mud, snow, loose debris, and when climbing rocks. The first peak portion 241a may extend radially and axially outward from the second peak portion 214b. The radially innermost edge of the first peak portion 214a may comprise three edge segments 219a, 219b, and 219c. The three edge segments 219a, 219b, 219c may be positioned end to end from each other to form an elongated-reverse-z edge. The radially innermost edge of the second peak portion 214b may comprise a single edge segment 219d that may extend substantially parallel to the edge segment 219a.

With reference now to FIGS. 2-4, 11, the fourth shoulder block 220 may comprise a fourth main portion 221, a connecting portion 222, a second-surface portion 223, and a peaked shoulder extension 224. The fourth shoulder block 220 may further comprise a third sipe 207 that is substantially similar in size and location to the first sipe 205 of the third shoulder block 210. The fourth main portion 221 may comprise a four-blade, axially elongated portion that, in one embodiment of the invention, may be similar in size and shape to the third main portion 211. The fourth main portion 221 may extend radially from the tread surface 41 to a first radial surface 225. The fourth main portion 221 may comprise a plurality of inner sipes, for example 3, 221a, 221b, and 221c. The plurality of inner sipes 221a, 221b, and 221c may be less deep and more narrow than the circumferential grooves 54, 55, 56. The plurality of sipes 221a, 221b, and 221c may be substantially parallel to each other and may be substantially equidistance apart. The connecting portion 222 and the second-surface portion 223 may connect the fourth main portion 221 to the peaked shoulder extension 224 and may be substantially similar in size and shape to the connection portion 212 and the second-surface portion 213 respectively. The second-surface portion 221 may extend radially from the tread surface 41 to a second radial surface 228. The second radial surface 228 may be radially inward from the first radial surface 225. The peaked shoulder extension 224 may extend the fourth shoulder block 220 into the second shoulder region 43b to a point PP2. The point PP2 may be radially aligned with the point PP1 of the peaked shoulder extension 214. In one embodiment, the peaked shoulder extension 224 may comprise a shape that substantially similar to the shape of the peaked shoulder extension 214.

With reference now to FIGS. 2-4, 10-12, the elongated pad 230 may be axially elongated and extend radially from the tread surface 41 to a radial pad surface 231. The radial pad surface 231 may be radially inward from radial surfaces 223, 225 of the fourth shoulder block 220 and the radial surfaces 217, 218 of the third shoulder block 210. The elongated pad 230 may comprise an axially inner portion 232 and an axially outer portion 233. The elongated pad 230 may have an axially innermost width W1, a width W2 at the point where the axially inner portion 232 abuts the axially outer portion 233, and an axially outmost width W3. The axially innermost width W1 and the axially outermost width W3 may be less than the width W2. According to one embodiment of the invention, the axially innermost width W1 is approximately equal to the axial outmost width W3. The shorter raised pad 240 extends from a point approximately circumferentially aligned with the point where the axially inner portion 232 and the axially outer portion 233 of the elongated raised pad 230 abut to a point axially inward from the axially outermost point of the elongated raised pad 230.

With reference now to FIGS. 2-3, 5-6, 13-15, the first shoulder region 43a may comprise a plurality of u-shaped sidewall blocks 310. The plurality of u-shaped sidewall blocks 310 may be circumferentially aligned and at least partially separated by one of the first shoulder extensions 114. The u-shaped sidewall blocks 310 may extend from a point PU1 that is radially inward from the point PN of the first shoulder extensions 114, to a point radially inward of the first lateral edge 44. The u-shaped sidewall blocks 310 may comprise an axially inner-u portion 311 and an axially outer-u portion 312. The axially inner-u portion 311 may comprise an inner-u base portion 311a, a first inner-u leg 311b, and a second inner-u leg 311c. The axially inner-u portion 311 may extend from the sidewall portion 16a to a first axial surface 313. Each first inner-u leg 311b may be aligned with one of the elongated raised pads 130, and each second inner-u leg 311c may be aligned with one of the shorter raised pads 140. The inner-u base portion 311a may be substantially radially centered across one of the second shoulder extensions 124.

With continued reference to FIGS. 2-3, 5-6, 13-15, the axially inner-u portion 311 may be radially adjacent and at least partially encompassed by the axially outer-u portion 312. The axially outer-u portion 312 may extend axially from the sidewall portion 16a to a second axial surface 314. The second axial surface 314 may be axially outward from the first axial surface 313. The axially outer-u portion 312 may comprise an outer-u base portion 312a, a first outer-u leg 312b, and a second outer-u leg 312c. The first outer-u leg 312b may extend to a point axially outward from the radially outermost point of the first inner-u leg 311b. Each first outer-u leg 312b may be aligned with one of the shorter raised pads 140. The second outer-u leg 312c may extend to a point axially outward form the radially outermost point of the second inner-u leg 311c. Each second outer-u leg 312c may be aligned with one of the elongated raised pads 130. The outer-u base portion 312a may be substantially radially centered across one of the second shoulder extensions 124.

With reference now to FIG. 2-3, 10, 16-18, the second shoulder region 43b may comprise a plurality of peak-shaped sidewall blocks 330. The peak-shaped sidewall blocks may be circumferentially aligned and separated at least partially by either one of the peaked shoulder extensions 214, 224. The peak-shaped sidewall block may extend radially from a point PPS that is radially inward from the point PP1 or PP2 to a point radially inward from the second lateral edge 46. The peak-shaped sidewall block 330 may comprise a first portion 331 and a second portion 332. The first portion 331 may be radially inward from the second portion 332 and may extend axially from the sidewall portion 16b to a first axial surface 333. The first portion 331 may comprise a radially innermost edge 334. The radially innermost edge 334 may comprise a first edge segment 334a and a second edge segment 334b. The first edge segment 334a may begin at the point PPS and extend radially outward at a first edge segment angle A1 that is measured from a reference line that is substantially parallel to the second lateral edge 46. The second edge segment 334b may begin at the point PPS and extend radially outward at a second edge segment angle A2 that is measured from a reference line that is substantially parallel to the second lateral edge 46. In one embodiment of the invention, the first edge segment angle A1 is the same as, but oppositely oriented to, the second edge segment angle A2. In another embodiment, the first edge segment angle A1 may be greater than the second edge segment angle A2. In yet another embodiment of the invention, the second edge segment angle A2 may be equal to 0°. The edge segment angles A1, A2 may be any angles chosen with sound engineering judgment. The second edge segment 334b may comprise a beveled or chamfered edge.

With continued reference to FIGS. 2-3, 10, 16-18, the second portion 332 of the peak-shaped sidewall block 330 may extend axially from the sidewall portion 16b to a second axial surface 335. The second axial surface 335 may be axially inward from the first axial surface 333. The radially innermost edge 336 of the second portion 332 may comprise two edge segments 336a, 336b and a blind groove 337. The two edge segments 336a, 336b and the blind groove 337 may comprise substantially z-shaped edge. The radially outermost edge 338 of the peak-shaped sidewall block 330 may be substantially parallel to the second edge segment 336b.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A light truck or passenger vehicle tire comprising:
   (I) a carcass structure;
   (II) a belt structure;
   (III) a tread comprising:
   (a) a first and a second lateral tread edge;
   (b) a tread surface having a plurality of traction elements extending radially outward from a tread base;
   (c) a plurality of lateral grooves;
   (d) a plurality of circumferential grooves that divide the plurality of traction elements into a plurality of rows of traction elements, the plurality of rows of traction elements comprising:
      (1) a first shoulder row adjacent to the first lateral tread edge, the first shoulder row comprising:
         (i) a first block element that comprises: a first main portion, a first connecting portion, a first second-surface portion, and a first shoulder extension that extends to a point axially outward from the first lateral tread edge, wherein the first main portion extends axially from one of the circumferential grooves to a point axially inward from the first lateral tread edge;
  (ii) a second block element that comprises: a second main portion, a second connecting portion, a second second-surface portion, and a second shoulder extension, wherein the second main portion extends axially from one of the circumferential grooves to the first lateral tread edge;
  (iii) a first and a second raised pad elements that are positioned within one of the lateral grooves; and,
  (iv) wherein the first block element and the second block element are circumferentially adjacent to each other and are separated by one of the lateral grooves, the first raised pad element, and the second raised pad element;
(2) a second shoulder row adjacent to the second lateral tread edge, the second shoulder row comprising:
  (i) a third block element that comprises: a third main portion, a first connecting portion, a first second-surface portion, and a first peaked shoulder extension, having a generally z-shaped edge, that extends to a point axially outward from the second lateral tread edge, wherein the third main portion extends axially from one of the circumferential grooves to a point axially inward from the second lateral tread edge;
  (ii) a fourth block element that comprises: a fourth main portion, a second connecting portion, a second second-surface portion, and a second peaked shoulder extension having a generally z-shaped edge, wherein the fourth main portion extends axially from one of the circumferential grooves to the second lateral tread edge;
  (iii) a third and a fourth raised pad elements positioned within one of the lateral grooves,
  (iv) wherein the third block element and the fourth block element alternate circumferentially and are separated by one of the lateral grooves, the third raised pad element, and the fourth raised pad element;
(3) at least one central row disposed between the first shoulder row and the second shoulder row;
(IV) a first sidewall structure comprising:
  (a) a maximum section width location that divides the first sidewall structure into a first lower sidewall region and a first upper sidewall region;
  (b) wherein the first upper sidewall region extends from the maximum section width location to the first lateral tread edge; and,
  (c) wherein the first upper sidewall region comprises a first u-shaped sidewall block element comprising a base portion and a pair of legs that extend from the base portion, wherein the second shoulder extension of the second block element extends between the pair of legs of the first u-shaped sidewall block; and,
(V) a second sidewall structure comprising:
  (a) a maximum section width location that divides the second sidewall structure into a second lower sidewall region and a second upper sidewall region;
  (b) wherein the second upper sidewall region extends from the maximum section width location to the second lateral tread edge; and,
  (c) wherein the second upper sidewall region comprises a peaked sidewall block element having a generally z-shaped edge.

2. The light truck or passenger tire of claim 1, wherein the second main portion is substantially the same shape and size as the fourth main portion.

3. The light truck or passenger tire of claim 2, wherein the first main portion is substantially the same shape and size as the third main portion.

4. The light truck or passenger tire of claim 1, wherein the first peaked shoulder extension is substantially the same shape and size as the second peaked shoulder extension.

5. The light truck or passenger tire of claim 1, wherein the first raised pad element comprises a greater axial length than the second raised pad element and the third raised pad element comprises a greater axial length than the fourth raised pad element.

6. The light truck or passenger tire of claim 5, wherein the first raised pad element is substantially the same shape and size as the third raised pad element and the second raised pad element is substantially the same shape and size as the fourth raised pad element.

7. The light truck or passenger tire of claim 1, wherein the first shoulder row has a net-to-gross ratio that is substantially the same as the net-to-gross ratio of the second shoulder row.

8. The light truck or passenger tire of claim 7, wherein the net-to-gross ratio of the at least one central row is greater than the net-to-gross ratio of the first or second shoulder rows.

9. The light truck or passenger tire of claim 1, wherein the first shoulder zone has an axial width that is substantially the same as the axial width of the second shoulder zone.

10. The light truck or passenger tire of claim 1, wherein the first main portion and the third main portion each comprise a single ripe.

11. The light truck or passenger tire of claim 10, wherein the first main portion and the third main portion each comprise a semi-blind groove.

12. The light truck or passenger tire of claim 11, wherein the semi-blind groove is adjacent to one of the circumferential grooves.

13. The light truck or passenger tire of claim 1, wherein the second and third main portions each comprise a plurality of sipes.

14. The light truck or passenger tire of claim 1, wherein the second and third main portions each comprise four sipes.

15. The light truck or passenger vehicle tire of claim 1 wherein:
  the first upper sidewall region comprises a second u-shaped sidewall block element comprising a base portion and a pair of legs that extend from the base portion; and,
  the first shoulder extension of the first block element extends between the first and second u-shaped sidewall block elements.

16. The light truck or passenger vehicle tire of claim 15 wherein the peaked sidewall block element of the second upper sidewall region is positioned between the first peaked shoulder extension of the third block element and the second peaked shoulder extension of the fourth block element.

17. The light truck or passenger vehicle tire of claim 1 wherein each of: the first peaked shoulder extension; the second peaked shoulder extension; and, the peaked sidewall block element comprises first and second portions that extend axially a different amount.

18. The light truck or passenger vehicle tire of claim 1 wherein the first and second sidewall structures are asymmetric.

19. The light truck or passenger vehicle tire of claim 1 wherein:
  the first u-shaped sidewall block element comprises an axially inner u portion having an inner base portion and a pair of inner legs that extend from the inner base portion and an axially outer u portion having an outer base portion and a pair of outer legs that extend from the outer base portion;

the axially inner u portion extends from the first upper sidewall region to a first axial surface;

the axially outer u portion extends from the first upper sidewall region to a second axial surface; and, the second axial surface is axially outward from the first axial surface.

* * * * *